Aug. 7, 1962 R. W. MAY 3,048,848
METHOD AND APPARATUS FOR CHART RECORDING
Filed Jan. 8, 1959 3 Sheets-Sheet 1

INVENTOR
Richard W. May
BY
Munroe H. Hamilton
ATTORNEY

INVENTOR
Richard W. May
BY
Munroe V. Hamilton
ATTORNEY

Aug. 7, 1962 R. W. MAY 3,048,848
METHOD AND APPARATUS FOR CHART RECORDING
Filed Jan. 8, 1959 3 Sheets-Sheet 3
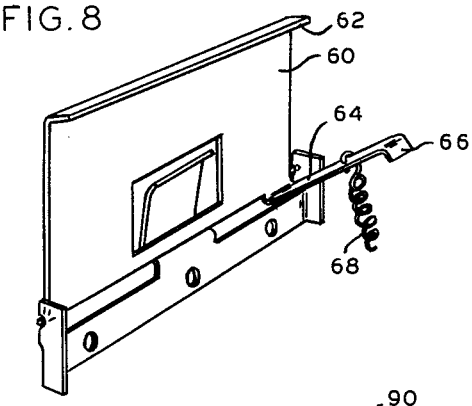
FIG. 8
FIG. 9
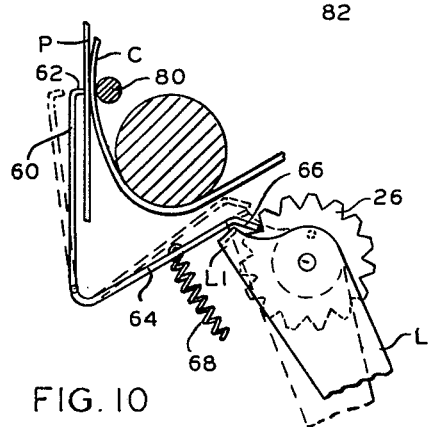
FIG. 10
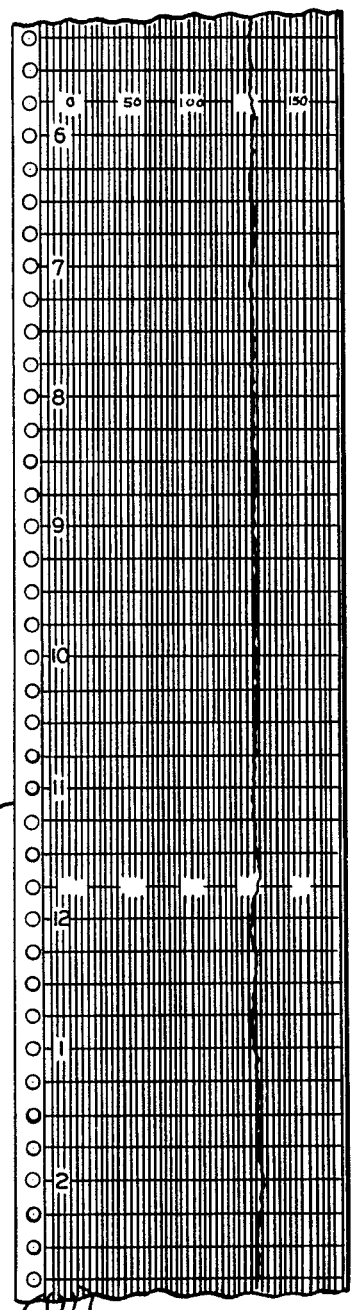
FIG. 11
INVENTOR
Richard W. May
BY
Maurice A. Hamilton
ATTORNEY United States Patent Office 3,048,848
Patented Aug. 7, 1962

3,048,848
METHOD AND APPARATUS FOR CHART RECORDING
Richard W. May, Lexington, Mass., assignor to The Rust Industrial Company, Inc., Manchester, N.H., a corporation of New Hampshire
Filed Jan. 8, 1959, Ser. No. 785,709
3 Claims. (Cl. 346—78)

This invention relates in general to chart recording apparatus of the class in which a strip or roll of paper is provided with longitudinally extending lines and is employed to receive recorded information. More specifically, the invention is concerned with a method and and apparatus for chart recording of metered information such as is denoted by a pivoted meter pointer moving in response to electrical signals, pressure changes or other variants.

Essentially, the invention has its origin in the novel concept of utilizing a pivoted meter pointer, while the latter member is actually denoting metered information, as a means of inscribing information on a strip chart. A principal objective sought to be realized is a simple, positive and efficient method wherein metered information may be recorded as it is obtained and instantly inscribed in a continuous manner on a chart without the aid of pencil, ribbon, ink or other commercially employed marking means. Another object of the invention is to devise a special form of strip recording chart for use in combination with pivoted meter pointer and a novel striker mechanism. The invention is further directed towards devising a low cost apparatus capable of recording metered information for very long periods of time without need for servicing or repairs, as well as being suitably designed to operate with a gear driven roll feeding mechanism for handling strip charts and maintaining a suitable tension condition therein.

With the foregoing concept and related objects in mind, I have devised a novel recording procedure in which a pressure sensitive paper is utilized as a chart recording medium and the pivoted pointer of a meter, while positioned in varying recording positions, is employed to receive and transmit a continuous succession of relatively light pressures. These applications of pressure are of percussive nature and function to produce marks on the pressure sensitive paper which appear in the form of a line of recorded information.

In carrying out the recording procedure of the invention, I have devised a novel striker mechanism which is designed to cooperate with a meter actuated pointer in a unique manner to deliver percussive applications of pressure of suitable intensity for developing marks on the pressure sensitive paper.

I have also devised a pressure sensitive paper with a novel line spacing and a special platen roll assembly for supporting the pressure sensitive paper when struck by a pointer so that a percussive effect is carried out and a mark can be made on the paper in a satisfactory manner.

These and other objects and novel features will be more fully understood and appreciated from the following description of a preferred embodiment of the invention selected for purposes of illustration and shown in the accompanying drawings in which, FIG. 1 is a perspective view illustrating a recording unit of the invention and showing a pressure sensitive paper in an operative position with a line of recorded information having been formed thereon in accordance with the invention;

FIG. 8 is a perspective view of a striker element;

FIG. 9 is a detail elevational view of a yieldable shaft mounting of a re-wind roll;

FIG. 10 is a detail cross sectional view of striker actuating means; and

FIG. 11 is a fragmentary view of a chart of the invention in one desirable form.

Figure 1:
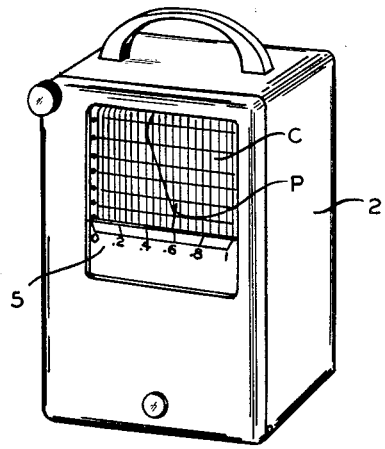

This application is a continuation-in-part of my copending application Serial No. 710,001 filed January 20, 1958; and now abandoned.

In the preferred form of the invention shown in the drawings there are generally included as principal components a special strip chart element, a metering device and pivoted pointer responsive thereto, an apparatus for moving the chart past the pointer and a striker mechanism for periodically forcing the pointer into contact with the chart. The striker mechanism is particularly organized and arranged in cooperating relationship with respect to both the metering device and the recording chart apparatus in such a way as to permit relatively strip percussive forces to be received by the metering pointer and instantly transmitted by the pointer onto the recording chart element.

Figure 2:
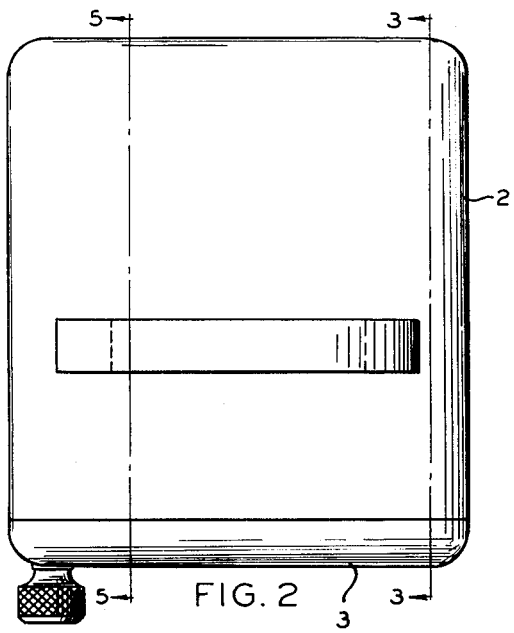
FIG. 2 is a plan view of the recorder.
Figure 3:
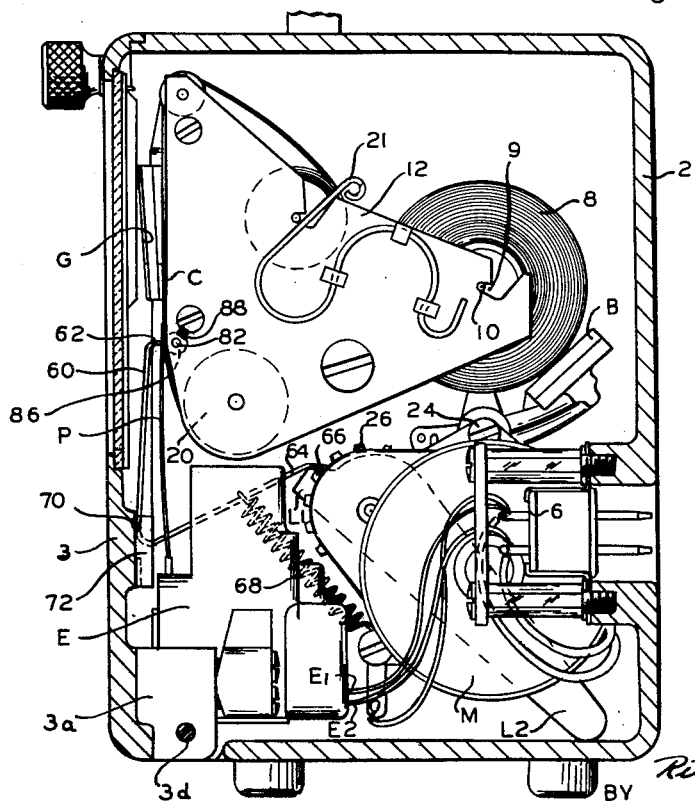
FIG. 3 is a cross sectional view taken on the line 3—3 of FIG. 2.

Considering these components in greater detail, the metering device is housed in a casing member 2 and includes a front panel 3 and a meter scale 5 mounted in recessed relationship with respect to panel 3. At its inner surface the panel 3 has solidly fixed at opposite lower corner sections thereof bearing blocks as 3a and 3b in which are received pins 3d for pivotally supporting the panel 3 in openings at the lower front portion of the casing 2. Thus the top of the panel may be swung outwardly as suggested in dotted lines as shown in FIG. 2. The metering device is provided with a pointer P which is arranged to move into positions of register with the scale 5 and which is operatively connected to a conventional form of electro-magnetic metering device E as shown in FIG. 3. Electrical conductors E1 and E2 are connected to outlet 6 and electrical signals which are desired to be metered and recorded are conducted through these conductors to the member E to activate the pointer.

Figure 4:
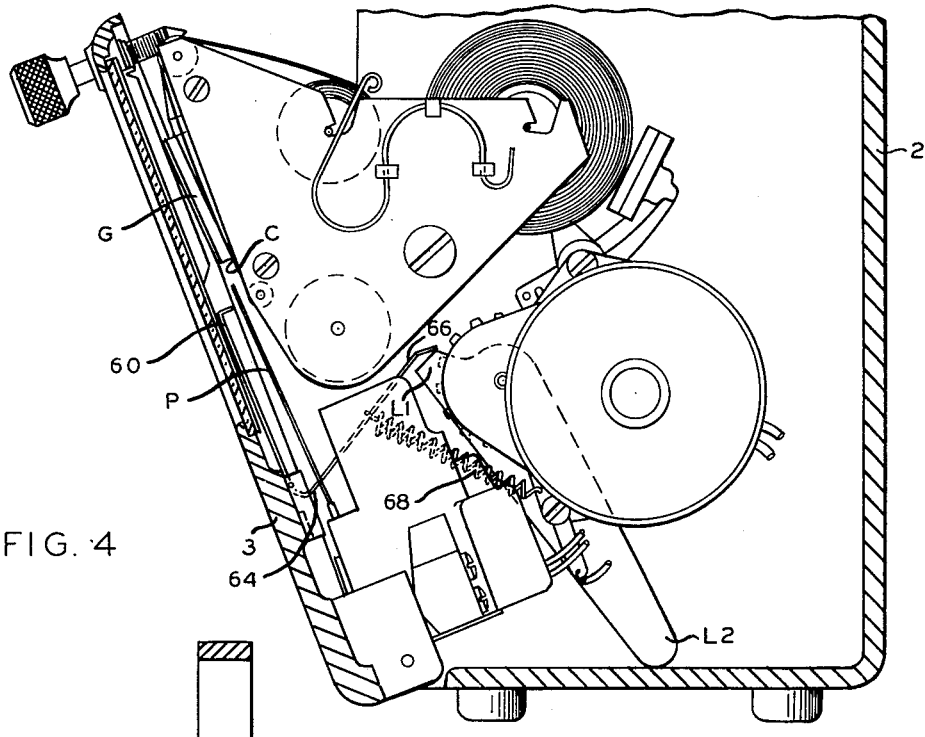
FIG. 4 is a sectional view showing the recorder with front wall opened.

Reference character C denotes the special strip chart which consists of a pressure sensitive paper and which is normally supported in rolled form on a supply roll 8. A shaft 10 projects axially outwardly from either end of the drum and is pivotally supported in elongated bearing slots as 9 formed in respective mounting plates 12 and 14 as shown in FIGS. 2 and 4. Mounting plate 14 is rigidly secured by suitable fastenings to the block 3b at its bottom edge, and at its upper edge to another block 15, welded or otherwise attached to front panel 3. The mounting plate 12 is secured in spaced parallel relation to the plate 14 by means of transversely disposed spacing rods 16 and 18.

Mounted for rotative movement between these plates 12 and 14 is a top guide roll 19; a power driven timing device 20 formed with uniformly spaced-apart studs which are adapted to engage in suitably formed perforations occurring along one edge of the pressure sensitive recording element C; and a driven rewind roll 22 which is arranged to receive and rewind the strip chart as it is fed from the supply drum and passed across the scale 5 directly below the arc of movement of the pointer P. A spring 21 resiliently holds the re-wind roll so that it may be detached when desired.

With the strip chart element C movable in the manner described with reference to the pivoted pointer, it will be apparent that the pointer will move in an arcuate path of travel across the chart. It is pointed out that a correction is necessitated by reason of the fact that the pointer travels in an arc, while the striker is a straight line. An important feature of the invention is the provision of a strip chart member with variably spaced longitudinally extending lines. The correction is realized by having the spaced distances between the lines represent linear projections of arcuate lengths included in the circular arc of travel of the pointer moving from one edge of the chart to the opposite edge thereof. One specific example of a variably spaced line arrangement is illustrated in FIG. 11. In chart element C, as noted in this figure, the first line appearing at the left hand side of the strip chart element may be designated as line 0. The next line is line .1; third line is line .2 and the fourth line is line .3. Line .1 is spaced from line 0 by a distance of, for example .052 inch; line .2 is spaced from line 0 a distance of .104 inch; line .3 is spaced apart from line 0 a distance of .155 inch; line .4 is spaced from line 0 a distance of .205 inch. These variations represent the linear projections of lengths of arcs included in the arc of travel of the pointer P across the chart element. By thus varying these spaces a true reading of a measured quantity represented by the pointer P may be realized at any point across the chart as well as longitudinally of the chart. In one typical instance of measuring values it may be desired to use the strip chart element C for measured fluctuation in a line voltage. The meter pointer may be set so that one multiampere of direct current will produce a displacement of the pointer through one scale reading in the scale shown in FIG. 1. Various other types of scales and measurements may be similarly denoted.

Figure 6:
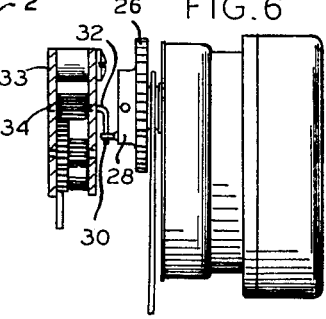
FIG. 6 is a detail elevational view of a component of the recorder.
Figure 7:
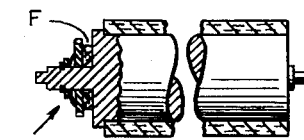
FIG. 7 is a detail cross sectional view.

To actuate the power driven time drum and the rewind roll, I provide an electrical motor M which is fixed to mounting plate 14 on posts as 24. As shown in FIG. 6, a gear 26 is rotated by motor M and at one side of gear 26 is a hub 28 from which projects a pin 30. Arranged to project into the path of movement of the pin 30 is a crank 32 mounted for rotation in a gear box 33 which has fixed thereon a gear 34. Driven by gear 34 is a train of intermeshing gears 35, 36, 37, 38, 39, 40 and 41 which provide for rotative movement of the main driving drum 20 as shown in FIG. 4. Gear 41 also meshes with a gear 42 which in turn meshes with and drives a gear 43 for imparting rotative movement to the re-wind roll 22.

It will be appreciated that the chart element must be moved at a uniform speed and must be carefully guided at all points along its path of travel, which necessitates maintaining a substantially uniform tension on both sides of the time drum 20. In accordance with the invention, I accomplish this by the use of a friction brake B on the feed-off roll and an axial friction clutch F on the rewind roll. The supply roll 20 is at its greatest diameter at the start of an unwinding operation, and smallest at the end of the unwinding; the exact opposite is true of the re-wind paper roll 22. Therefore, the paper tension, to always be equal on both sides of the main roller, must take account of this fact.

The friction brake B includes a brake arm 49 having a friction shoe 48. The arm is pivoted on a shaft 50 secured to the plate 14. The opposite end of the brake arm is resiliently held by a spring 52 anchored at 54. By means of this arrangement, it can be seen that the brake arm exerts greatest paper tension when the diameter of the paper roll is at its maximum size, since the spring is extended to its greatest degree of elongation at this time.

Likewise, the clutch F may, for example, consist of a friction disc and spring washer assembly 56. In such an arrangement, the axial clutch exerts most paper tension when the paper roll is at its smallest diameter because the lever arm (radius) is smallest at this point. By adjusting the tension of the brake spring and the holding force of the clutch assembly, there may be maintained a paper tension of correct value and of substantially equal magnitude on both sides of the main driving roll 20. In this connection, I have found that a satisfactory tension for operating a chart in accordance with the invention is a tension of seven ounces.

Figure 5:
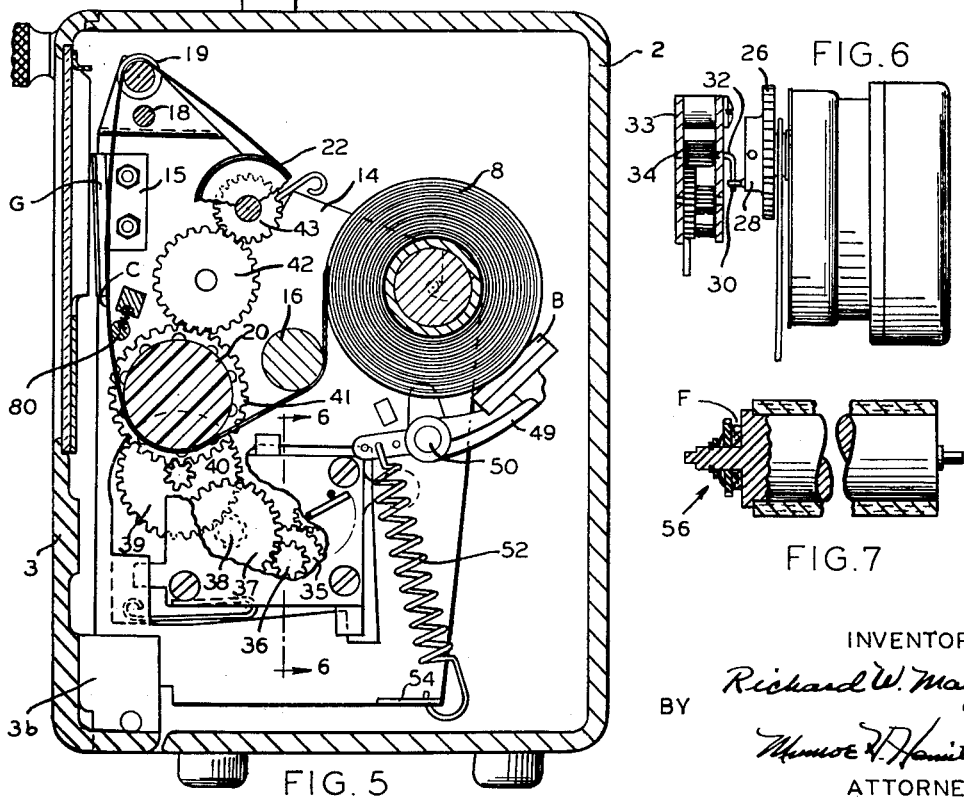
FIG. 5 is a cross sectional view taken on the line 5—5 of FIG. 2.

I may also desire to provide a guard element which is designed to prevent the strip chart element C from becoming entangled with the pointer along its perforated marginal edge. The guard G consists of an L shaped member fixed to the front panel as shown in FIGS. 3, 4, 5 and arranged to extend between the strip chart and the indicator along the marginal edge of the chart.

With this correctly tensioned chart element and pointer means above described, I combine a repetitive device consisting essentially of a striker plate 60 illustrated in FIG. 8 and also shown in FIGS. 3 and 4. This striker plate is of rectangular shape and is formed with a turned edge 62 which is adapted to move into contact with and strike the pointer P. At its opposite lower edge the striker is provided with an extension arm 64 projecting angularly upwardly therefrom and terminating in a hooked end 66. The hooked end 66 is normally forced into engagement with the gear 26 by means of a spring 68. As gear 26 rotates, it swings the striker extension upwardly a very slight distance on pivot pins as 70 received in a striker support bracket 72.

Upon further rotation of gear 26, the tension of spring 68 acts to snap the hooked end 66 back into the space between the engaging gear and the next succeeding gear, with the result that a light but definitely percussive force is produced by the striker edge 62 against the pointer P. The pointer P is preferably loosely mounted on the meter device, and the percussive force is instantly transmitted through the pointer onto the paper with the pointer being displaced very slightly out of its normal arcuate path of travel.

It is pointed out that in order for the percussive forces to be transmitted properly onto the pressure sensitive paper, it is essential to support the paper along its rear surface. It will also be appreciated that in applying a percussive blow to a pointer member of relatively light construction, such as is disclosed in the invention, there is a strong tendency for the meter pointer to bounce or vibrate in an undesirable manner.

In accordance with the invention, I have further devised a special paper supporting roll assembly against which a portion of the pressure sensitive paper may be supported as the pointer transmits percussive forces. In this special roll assembly there is included a cylindrical roll element 80 which is formed with pins 82 and 84 adapted to be received loosely in elongated openings 86 formed in the plates 12 and 14. The member 80 is resiliently held in the elongated openings 86 by means of a spring 88 in such a position that the cylindrical member normally extends into the path of travel of the strip chart element C. The spring 88 is anchored in a retaining bar 90 fixed between the sides of the plates 12 and 14 above the member 80, and the lower end of the spring 88 may, for example, be seated in an opening formed centrally along the member 80 as suggested in FIG. 9.

By means of this arrangement, application of a percussive force by the striker mechanism presses the pointer P against the paper, and a mark is inscribed. However, the member 80 tends to skid in the elongated openings 86 sufficiently so that the force of the blow is absorbed or cushioned, and a damping effect is accomplished which effectively eliminates any tendency for the pointer to vibrate or jump.

I have also provided a means for forcing the striker element away from the pointer when the front panel is opened. This is accomplished by means of a pivoted spring loaded lever L mounted on the same shaft with gear 26 as shown in FIG. 10. The lever is formed with a cam portion L1 for engaging with the extension 64 and at its opposite end 22 is extended so as to engage against the bottom of casing 2 when the front panel is closed thereby forcing the striker away from the pointer.

The striker mechanism described is designed to operate specifically with a type of pressure sensitive paper which is commonly manufactured and sold, and which may, for example, consist of a kraft base having a coating of carbon or similar material over which is applied a frangible film body of cellular or foam nature. This frangible film body, when subjected to percussed forces, will break down and permit carbon to permeate through, thus creating a mark. It is intended that the apparatus of the invention may be employed with various other sheet materials including other pressure sensitive papers, plastics or other sensitive mediums which are capable of embodiment as a strip chart element.

The strip chart element is releasable from the mounting plates by bending the holding spring shown, and a new supply of paper may be readily passed around the timing drum and secured to the reroll member when desired.

The specific tensioning devices and conditions noted above are especially cited for use of the recorder apparatus in radio and television stations where electrical signals are desired to be recorded. However, it is contemplated that the recorder may be employed in conjunction with other signal information or other types of changes, such as pressure changes, temperature changes, radiation changes, and the like.

From the foregoing description of the drawing, it will be evident that I have provided an efficient recorder method and apparatus of novel character.

It is pointed out that the spring actuated repetitive movement of the striker is accomplished in an extremely simplified fashion and an important feature of the arrangement is freedom from breakdown or servicing which necessarily is inherent in a spring loaded arm and gear actuating unit of the particular form disclosed. As a result, the application of percussive forces in uniformly spaced-apart intervals, and exerted with uniform intensity, may be carried out very conveniently over exceedingly long periods of time.

It will be seen that the particular combination of parts not only permits the application of pressure through a pointer member, but also provides for intervals occurring between the periods of pressure application during which intervals the pointer is entirely free to swing in its normal arcuate path of movement in response to signals received by the electro-magnetic metering apparatus. Control of paper movement and tensioning is satisfactorily accomplished and the paper handling parts are readily detachable from the casing when a new strip chart element is to be inserted.

While I have shown and described a preferred embodiment of the invention, it will be understood that I may employ other means of transmitting forces through a pointer, and other types of measuring devices may be utilized to actuate the pointer, and various other changes and modifications may be resorted to in keeping with the spirit of the appended claims.

Having thus described my invention, what I claim is:

1. An improved chart recording apparatus including a metering device, a pointer pivotally mounted in the metering device and responsive to a change in values observed by the metering device to move through a circular arc of travel, said pointer being displaceable in all positions of arcuate travel along planes passing through and coinciding with the axis of circular travel, a pressure sensitive strip recording chart mounted in the recording apparatus, means for continuously moving the chart in close proximity to the pointer, said moving means including take-up and take-off reels and a curved member arranged therebetween extending across said chart and supporting said chart substantially along a line only which is perpendicular to said chart, a striker mechanism including an edge arranged substantially parallel to said curved supporting member, with said pointer being arranged between said edge and said chart, said striker mechanism being constructed and arranged to periodically displace the edge against the pointer and the pointer against the chart with a percussive force thereby to produce a non-perforating, point-shaped mark only on that portion of said chart which is in linear contact with said curved supporting member.

2. Apparatus according to claim 1 wherein said curved member consists of a roll member secured to engage against a rear surface of the chart and yieldably support said linear portion of the chart when subjected to impact from the striker mechanism.

3. Apparatus according to claim 1 wherein the path of the chart take-up and take-off wheel is curved having a radius which is large against the radius of said curved supporting member.

References Cited in the file of this patent

UNITED STATES PATENTS

| | | |
|---|---|---|
| 1,124,820 | Simonsson | Jan. 12, 1915 |
| 1,255,202 | Messiter | Feb. 5, 1918 |
| 1,299,427 | Chapman | Apr. 8, 1919 |
| 1,847,918 | Blanchard | Mar. 1, 1932 |
| 2,034,543 | Twiss et al. | Mar. 17, 1936 |
| 2,108,089 | Turner | Feb. 15, 1938 |
| 2,169,230 | DeMartile | Aug. 15, 1939 |
| 2,299,693 | Green | Oct. 20, 1942 |
| 2,669,501 | Young et al. | Feb. 16, 1954 |

FOREIGN PATENTS

| | | |
|---|---|---|
| 421,703 | France | Oct. 21, 1910 |